United States Patent
Naser et al.

(10) Patent No.: US 12,231,687 B2
(45) Date of Patent: Feb. 18, 2025

(54) KARHUNEN LOEVE TRANSFORM FOR VIDEO CODING

(71) Applicant: InterDigital CE Patent Holdings, SAS, Paris (FR)

(72) Inventors: Karam Naser, Cesson-Sevigne (FR); Fabrice Le Leannec, Betton (FR); Franck Galpin, Cesson-Sevigne (FR); Thierry Dumas, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 78 days.

(21) Appl. No.: 18/021,794

(22) PCT Filed: Sep. 23, 2021

(86) PCT No.: PCT/EP2021/076155
§ 371 (c)(1),
(2) Date: Feb. 16, 2023

(87) PCT Pub. No.: WO2022/069331
PCT Pub. Date: Apr. 7, 2022

(65) Prior Publication Data
US 2024/0031606 A1    Jan. 25, 2024

(30) Foreign Application Priority Data
Sep. 29, 2020 (EP) ................................. 20306120

(51) Int. Cl.
*H04N 19/61* (2014.01)
*H04N 19/176* (2014.01)
*H04N 19/625* (2014.01)

(52) U.S. Cl.
CPC .......... *H04N 19/61* (2014.11); *H04N 19/176* (2014.11); *H04N 19/625* (2014.11)

(58) Field of Classification Search
CPC .... H04N 19/61; H04N 19/176; H04N 19/625; H04N 19/12; H04N 19/60; H04N 19/70
See application file for complete search history.

(56) References Cited

U.S. PATENT DOCUMENTS

2012/0008683 A1* 1/2012 Karczewicz ........... H04N 19/46
                                                   375/E7.243
2020/0137388 A1  4/2020 Kanoh et al.

OTHER PUBLICATIONS

Lan et al., "Variable Block-Sized Signal-Dependent Transform for Video Coding", IEEE Transactions on Circuits and Systems for Video Technology, vol. 28, No. 8, Aug. 1, 2018 (Aug. 1, 2018), pp. 1920-1933.

(Continued)

*Primary Examiner* — Farzana Hossain
(74) *Attorney, Agent, or Firm* — Xiaoan Lu

(57) ABSTRACT

In one implementation, KLT transform matrices are derived during the encoding or decoding process. In particular, the KLT transform matrices can be derived for either the primary transforming stage or the secondary transforming stage, or both. Because the KLT transform matrices can be derived at both the encoder and decoder sides, the KLT transform matrices do not need to be signaled in the bitstream. To derive the KLT transform matrix for a current block to be encoded or decoded, a template for the current block is defined, and is used to search in reconstructed regions multiple blocks with templates similar to the current template. Those multiple blocks are used to train the KLT transform matrix.

20 Claims, 7 Drawing Sheets

(56) References Cited

OTHER PUBLICATIONS

Siekmann et al., "Set of Transforms", Document: JVET-J0040, Joint Video Experts Team (JVET) of ITU-T SG 16 WP 3 and ISO/IEC JTC 1/SC 29/WG 11, 10th Meeting: San Diego, US, Apr. 10-20, 2018, pp. 1-8.
Siekmann et al., "Set of Transforms", JVET-J0040, Joint Video Exploration Team of ISO/IEC JTC1/SC29/WG11 and ITU-T SG.16, 10th Meeting: San Diego, US, Apr. 13, 2018, pp. 1-8.
Chen et al., "Algorithm Description of Joint Exploration Test Model 7 (JEM 7)", Joint Video Exploration Team (JVET) of ITU-T SG 16 WP3 and ISO/IEC JTC 1/SC 29/WG 11, Document JVET-G1001-v1, 7th Meeting, Turino, Italy, Jul. 13, 2017, 48 pages.

\* cited by examiner

KARHUNEN LOEVE TRANSFORM FOR VIDEO CODING

CROSS REFERENCE TO RELATED APPLICATIONS

This application is a U.S. National Stage Application under 35 U.S.C. 371 of International Patent Application No. PCT/EP2021/076155, filed Sep. 23, 2021, which is incorporated herein by reference in its entirety.

This application claims the benefit of European Patent Application No. EP20306120.5 filed Sep. 29, 2020, which is incorporated herein by reference in its entirety.

TECHNICAL FIELD

The present embodiments generally relate to a method and an apparatus for using Karhunen Loeve Transform (KLT) in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video encoding is provided, comprising: obtaining a prediction block and a residual block for a current block; obtaining a plurality of residual blocks, based on a plurality of respective neighboring blocks and said current block; applying a primary transform to said plurality of residual blocks to obtain a plurality of respective transformed residual blocks; obtaining a KLT transform matrix based on said plurality of transformed residual blocks; applying said primary transform to said residual block for said current block, to obtain a current transformed residual block; and applying said KLT transform matrix as secondary transform to said current transformed residual block.

According to another embodiment, a method of video decoding is provided, comprising: obtaining a prediction block and transform coefficients for a current block; obtaining a plurality of residual blocks, based on a plurality of respective neighboring blocks and said current block; applying a primary transform to said plurality of residual blocks to obtain a plurality of respective transformed residual blocks; obtaining a KLT transform matrix based on said plurality of transformed residual blocks; applying said KLT transform matrix as inverse secondary transform to said transform coefficients of said current block to obtain a current inverse secondary transformed block; and applying an inverse of said primary transform to said current inverse secondary transformed block.

According to another embodiment, a method of video encoding is provided, comprising: encoding a signal indicating that KLT transform is to be used to transform residuals of a block; and disabling said one or more other transform types for said block.

According to another embodiment, a method of video decoding is provided, comprising: decoding a signal indicating that KLT transform is to be used for inverse transform to reconstruct residuals of a block; and inferring that said one or more other transform types are disabled for said block.

One or more embodiments also provide a computer program comprising instructions which when executed by one or more processors cause the one or more processors to perform the encoding method or decoding method according to any of the embodiments described herein. One or more of the present embodiments also provide a computer readable storage medium having stored thereon instructions for encoding or decoding video data according to the methods described herein. One or more embodiments also provide a computer readable storage medium having stored thereon a bitstream generated according to the methods described herein. One or more embodiments also provide a method and apparatus for transmitting or receiving the bitstream generated according to the methods described herein.

DETAILED DESCRIPTION

Figure 1:
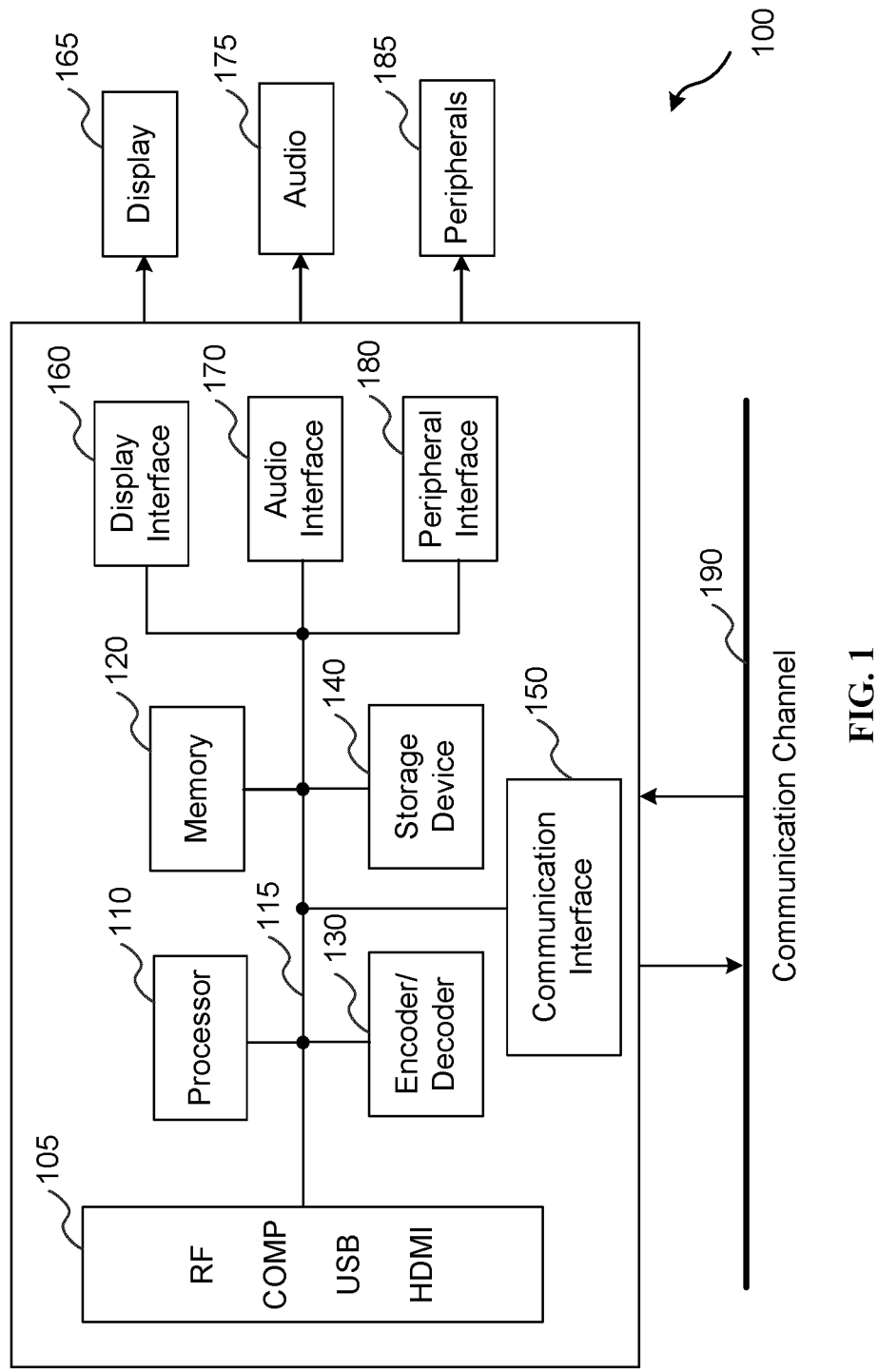
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
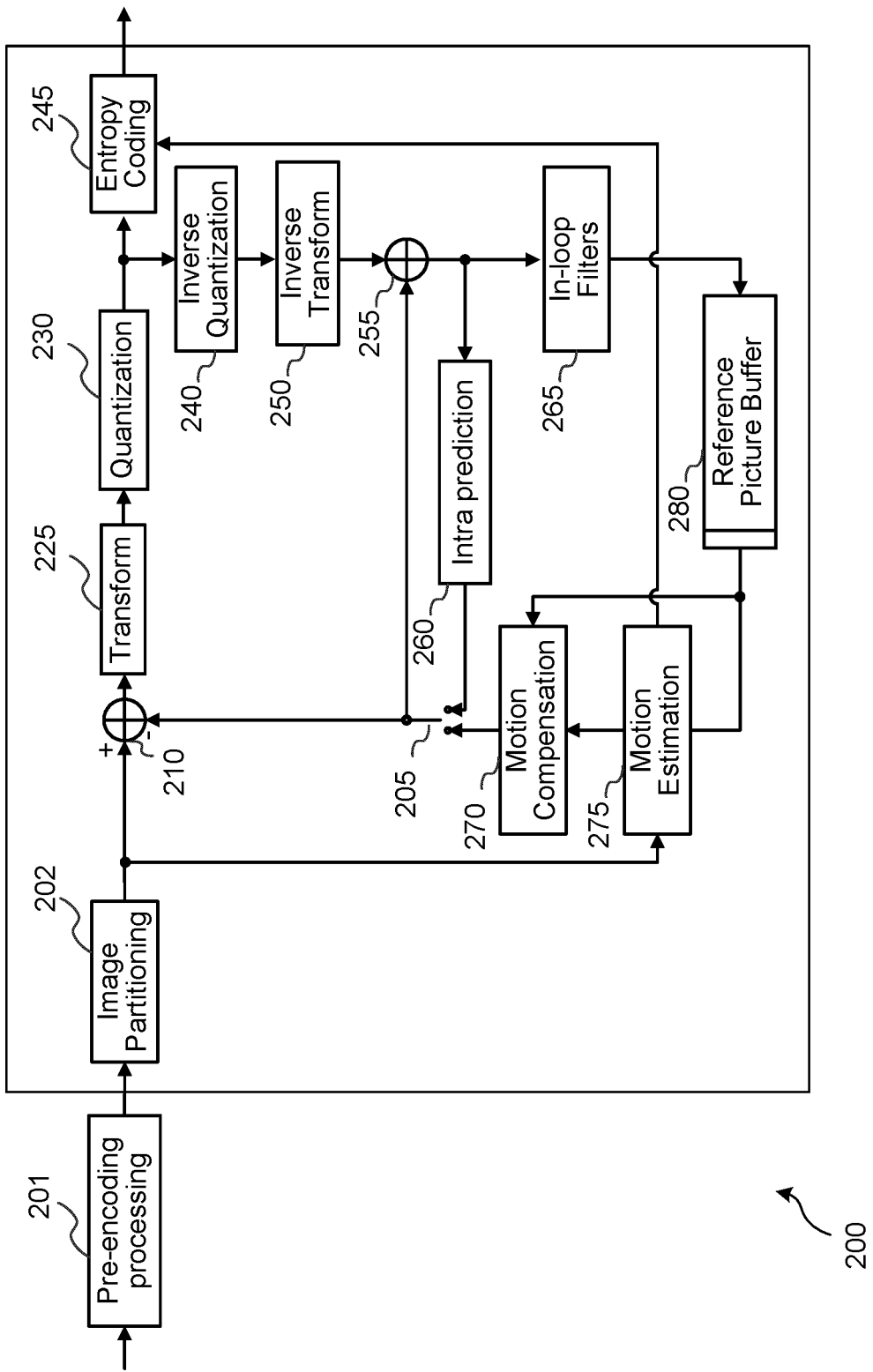
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, the terms "pixel" or "sample" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
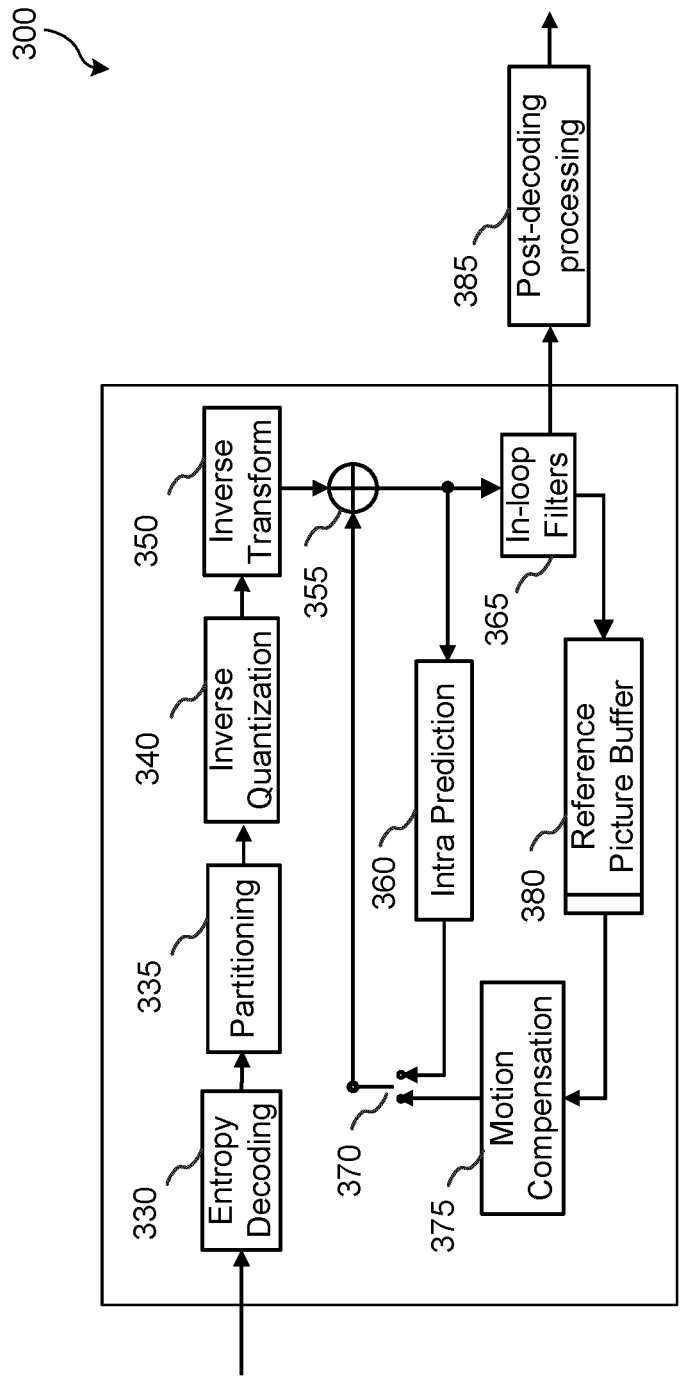
FIG. 3 illustrates a block diagram of an embodiment of a video decoder.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block can be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Transform coding is a fundamental part of video compression. It aims at providing a compact representation of the residual blocks that undergoes quantization and binary coding. Traditionally, DCT-II has been used as a core transform. However, VVC (Versatile Video Coding) is equipped with a variety of transforms (DCT-VIII and DST-VII) where combinations of these transforms can be used to transform a block. This technology is known as multiple transform selection (MTS).

The transformed coefficients can also be further transformed with a non-separable transform applied to the low frequency part. This is known as low-frequency non-separable transform (LFNST). The main idea of this transform stage is to further remove signal redundancies that are not captured by the separable two-dimensional first stage transform (DCT-II and MTS). The transform matrices are derived from offline training by minimizing the correlation between transform coefficients, using principal component analysis.

In the course of VVC development, KLT was introduced in the Joint Exploration Test Model 7.0 (JEM). It was an additional transform coding method where the transform matrices are derived during the coding process by accessing the reconstructed samples and computing the covariance matrix of the residual blocks. The eigenvectors of this matrix are considered as the transform matrices. This transform mode can come with an additional prediction mode, known as template matching prediction (TPM), where the prediction signal is generated by finding blocks within the reconstructed part of the current image that have similar L-shaped neighborhood, called template.

The present application proposes to use KLT, for example, for a VVC codec, in which transform matrices can be derived during the encoding or decoding process. Unlike the JEM model, this document proposes to derive the matrices for either the primary transform stage or secondary transform stage, or both. This is to improve the coding gain for post VVC codecs.

Figure 4:
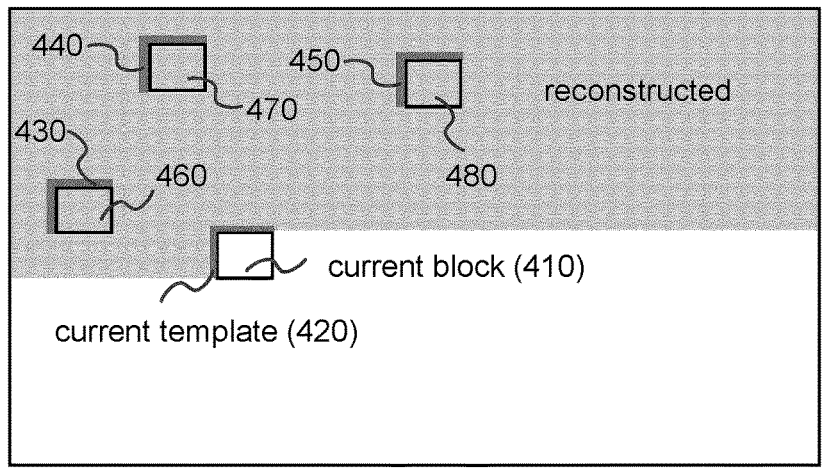
FIG. 4 illustrates the templates used in the KLT derivation in JEM (Joint Exploration Model) 7.0.
Figure 5:
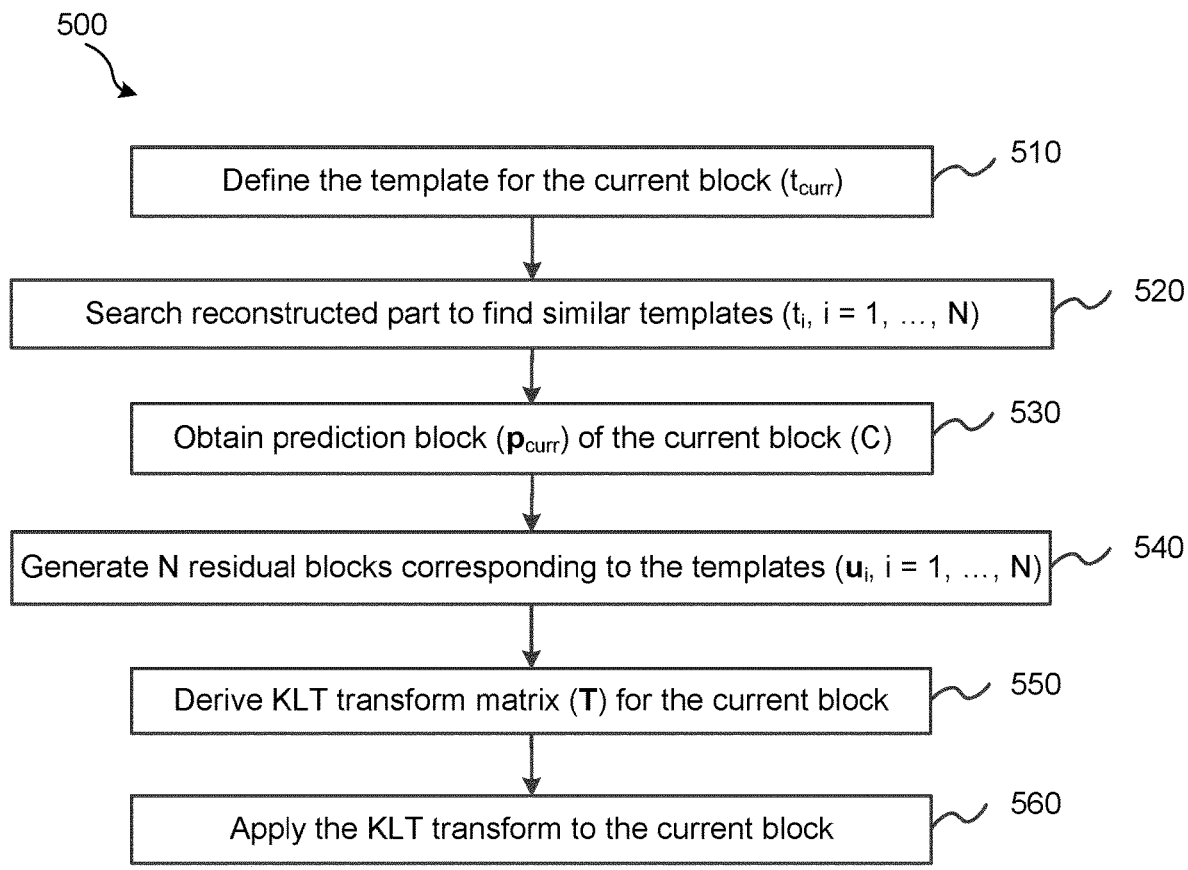
FIG. 5 illustrates the process of KLT derivation in JEM 7.0.

KLT was implemented in JEM 7.0. The derivation process is done as illustrated in FIG. 4 and FIG. 5. For the current block C (410), the current template ($t_{curr}$, 420) is defined (510) as the set of reconstructed pixels of the L-shaped neighbors (up and left) of the current block. In general, the template can take different shapes and include different numbers of samples. The current template is used to search (520) throughout the reconstructed part of the current image to find N similar templates (430, 440, 450). The N blocks (460, 470, 480) surrounded by the N templates respectively, named target blocks ($x_i$, i=1, 2, ..., N), are considered to be similar to the current block. Here, x i=$(x_{i1}, x_{i2}, \ldots, x_{iD})^T$ and D indicates the vector dimension which is the transform block size. For an example, for 4×8 transform block, D is 4 for the horizontal dimension and 8 for the vertical dimension. The statistics of the target blocks is assumed to be similar to the statistics of the current block. The prediction block can be generated (530) by the template matching prediction based on an average of the target blocks, or by conventional intra prediction (angular, DC or planar prediction). The residual of a particular target block is generated (540) by subtracting from the particular target block (obtained reconstructed images) the current prediction block $u_i$, i=1, 2, ..., N, where $u_i=(x_i-p)/\sqrt{N}$.

Then, these residual blocks are used as the training samples with zero mean for the KLT derivation. These N training samples can be represented by U=$(u_1, u_2, \ldots, u_N)$, which is a D×N matrix. Consider the covariance matrix Σ as given by:

$$\Sigma = UU^T$$

where the dimension of this covariance matrix is D×D. KLT bases (T) are then the eigenvectors (550) of this covariance matrix.

Specifically, first, the covariance matrix between the coefficients on both the horizontal and vertical direction is computed. Then, eigenvector of the horizontal and vertical covariance matrix is used (550) as the transform matrix, after proper scaling to be represented by integer variables within a fixed bit-depth, for the horizontal and vertical dimension. KLT is applied (560) to transform the current block. For inverse transform at the encoder or decoder, the transpose of the derived KLT transform, $T^T$, is used as the transform basis. Because the KLT transform matrix can be derived at the encoder and decoder sides, the KLT transform matrix does not need to be signaled in the bitstream.

KLT in JEM is limited to the primary transform stage, where no mechanism for training a secondary transform (LFNST like transform) is available. Further, KLT is not enabled with the new prediction tools of matrix weighted intra prediction (MIP), intra sub-partitioning (ISP) and multi-reference line prediction (MRL).

Signaling of KLT Flag

In JEM 7.0, KLT is coupled with TPM. That is, a single flag is signaled to indicate the usage of both TMP and KLT. However, it appears to be more logical to have an individual flag for KLT that is signaled at the same level as other transform related flags. Specifically, the index of MTS and LFNST are signaled at the end of the coding unit syntax. Therefore, it is proposed to signal the usage of KLT at this level, such that when KLT is signaled, both MTS and LFNST flags are not signaled and inferred to be zero.

The corresponding changes are (added part underlined):

|  | Descriptor |
|---|---|
| coding_unit( x0, y0, cbWidth, cbHeight, cqtDepth, treeType, modeType ) { <br> ... <br>   <u>cu_klt_flag[ x0 ][ y0 ]</u> <br>   <u>if (cu_klt_flag[ x0 ][ y0 ] == 0){</u> <br>     LfnstDcOnly = 1 <br>     LfnstZeroOutSigCoeffFlag = 1 <br>     MtsDcOnly = 1 <br>     MtsZeroOutSigCoeffFlag = 1 <br>     transform_tree( x0, y0, cbWidth, cbHeight, treeType, chType ) <br>     lfnstWidth = ( treeType == DUAL_TREE_CHROMA ) ? cbWidth / SubWidthC : <br>         ( ( IntraSubPartitionsSplitType == ISP_VER_SPLIT ) ? <br>         cbWidth / NumIntraSubPartitions : cbWidth ) <br>     lfnstHeight = ( treeType == DUAL_TREE_CHROMA ) ? cbHeight / SubHeightC : <br>         ( ( IntraSubPartitionsSplitType == ISP_HOR_SPLIT) ? <br>         cbHeight / NumIntraSubPartitions : cbHeight ) <br>     lfnstNotTsFlag = ( treeType == DUAL_TREE_CHROMA \|\| <br>         !tu_y_coded_flag[ x0 ][ y0 ] \|\| <br>         transform_skip_flag[ x0 ][ y0 ][ 0 ] == 0 ) && | ae(v) |

|  | Descriptor |
|---|---|
| ```
            ( treeType = = DUAL_TREE_LUMA | |
                ( ( !tu_cb_coded_flag[ x0 ][ y0 ] | |
                    transform_skip_flag[ x0 ][ y0 ][ 1 ] = = 0 ) &&
                    ( !tu_cr_coded_flag[ x0 ][ y0 ] | |
                    transform_skip_flag[ x0 ][ y0 ][ 2 ] = = 0 ) ) )
        if( Min( lfnstWidth, lfnstHeight ) >= 4 && sps_lfnst_enabled_flag = = 1 &&
            CuPredMode[ chType ][ x0 ][ y0 ] = = MODE_INTRA && lfnstNotTsFlag = = 1 &&
            ( treeType = = DUAL_TREE_CHROMA | | !IntraMipFlag[ x0 ][ y0 ] | |
            Min( lfnstWidth, lfnstHeight ) >= 16 ) &&
            Max( cbWidth, cbHeight ) <= MaxTbSizeY) {
            if( ( IntraSubPartitionsSplitType != ISP_NO_SPLIT | | LfnstDcOnly = = 0 ) &&
                LfnstZeroOutSigCoeffFlag = = 1 )
                lfnst_idx
        }
        if( treeType != DUAL_TREE_CHROMA && lfnst_idx = = 0 &&
            transform_skip_flag[ x0 ][ y0 ][ 0 ] = = 0 && Max( cbWidth, cbHeight ) <= 32 &&
            IntraSubPartitionsSplitType = = ISP_NO_SPLIT && cu_sbt_flag = = 0 &&
            MtsZeroOutSigCoeffFlag = = 1 && MtsDcOnly = = 0 ) {
            if( ( ( CuPredMode[ chType ][ x0 ][ y0 ] = = MODE_INTER &&
                sps_explicit_mts_inter_enabled_flag ) | |
                ( CuPredMode[ chType ][ x0 ][ y0 ] = = MODE_INTRA &&
                sps_explicit_mts_intra_enabled_flag ) ) )
                mts_idx
        }
    }
  }
 }
}
``` | <br><br><br><br><br><br><br><br><br>ae(v)<br><br><br><br><br><br><br><br>ae(v) | cu_klt_flag is a flag to indicate the usage of KLT. When it is equal to one, the decoder searches for similar templates to the current one, and computes the covariance matrices (horizontal and vertical dimensions) of the computed residuals of the target blocks. The transform matrices can be computed, for example, by eigenvector decomposition, same as in JEM. When cu_klt_flag is equal to one, there is no need to signal mts_idx or lfnst_idx as both are not used. This is because the primary transform has only single option: KLT, and the secondary transform is deactivated for this mode since the transform matrices are not trained for such type of primary transform type.

It should be noted that with this type of signaling, KLT is allowed for all intra prediction types: MIP, ISP and MRL, as well as inter prediction. It can also be allowed for chroma part. This completely decouples the transform type from prediction type. That is, whether MIP, TMP, ISP, MRL or regular prediction is performed, KLT can be used. This is because the signaling of usage at transform unit level is independent from the signaling of the prediction type.

To reduce the complexity, KLT may be limited to luma part and/or intra part only. Further, an SPS flag can be added to control the availability of this mode. Finally, KLT can be allowed up to certain size of CU. The corresponding signaling is as follows, where sps_klt_enabled_flag is an SPS flag to control the usage of KLT and MaxKltSizeY is the maximum size up to which KLT is allowed.

|  | Descriptor |
|---|---|
| ```
coding_unit( x0, y0, cbWidth, cbHeight, cqtDepth, treeType, modeType ) {
    ...
    if (sps_klt_enabled_flag == 1&& CuPredMode[ chType ][ x0 ][ y0 ] = = MODE_INTRA &&
treeType != DUAL_TREE_CHROMA && Max( cbWidth, cbHeight ) <= MaxKltSizeY)
        cu_klt_flag[ x0 ][ y0 ]
    if (cu_klt_flag[ x0 ][ y0 ] == 0){
        LfnstDcOnly = 1
        LfnstZeroOutSigCoeffFlag = 1
        MtsDcOnly = 1
        MtsZeroOutSigCoeffFlag = 1
        transform_tree( x0, y0, cbWidth, cbHeight, treeType, chType )
        lfnstWidth = ( treeType = = DUAL_TREE_CHROMA ) ? cbWidth / SubWidthC :
                    ( ( IntraSubPartitionsSplitType = = ISP_VER_SPLIT ) ?
                        cbWidth / NumIntraSubPartitions : cbWidth )
        lfnstHeight = ( treeType = = DUAL_TREE_CHROMA ) ? cbHeight / SubHeightC :
                    ( ( IntraSubPartitionsSplitType = = ISP_HOR_SPLIT) ?
                        cbHeight / NumIntraSubPartitions : cbHeight )
        lfnstNotTsFlag = ( treeType = = DUAL_TREE_CHROMA | |
                    !tu_y_coded_flag[ x0 ][ y0 ] | |
                    transform_skip_flag[ x0 ][ y0 ][ 0 ] = = 0 ) &&
                    ( treeType = = DUAL_TREE_LUMA | |
                        ( ( !tu_cb_coded_flag[ x0 ][ y0 ] | |
                        transform_skip_flag[ x0 ][ y0 ][ 1 ] = = 0 ) &&
                        ( !tu_cr_coded_flag[ x0 ][ y0 ] | |
                        transform_skip_flag[ x0 ][ y0 ][ 2 ] = = 0 ) ) )
``` | <br><br><br>ae(v) |

| | Descriptor |
|---|---|
| ```
   if( Min( lfnstWidth, lfnstHeight ) >= 4 && sps_lfnst_enabled_flag = = 1 &&
       CuPredMode[ chType ][ x0 ][ y0 ] = = MODE_INTRA && lfnstNotTsFlag = = 1 &&
       ( treeType = = DUAL_TREE_CHROMA | | !IntraMipFlag[ x0 ][ y0 ] | |
         Min( lfnstWidth, lfnstHeight ) >= 16 ) &&
       Max( cbWidth, cbHeight ) <= MaxTbSizeY) {
     if( ( IntraSubPartitionsSplitType != ISP_NO_SPLIT | | LfnstDcOnly = = 0 ) &&
         LfnstZeroOutSigCoeffFlag = = 1 )
       lfnst_idx
   }
   if( treeType != DUAL_TREE_CHROMA && lfnst_idx = = 0 &&
       transform_skip_flag[ x0 ][ y0 ][ 0 ] = = 0 && Max( cbWidth, cbHeight ) <= 32 &&
       IntraSubPartitionsSplitType = = ISP_NO_SPLIT && cu_sbt_flag = = 0 &&
       MtsZeroOutSigCoeffFlag = = 1 && MtsDcOnly = = 0 ) {
     if( ( ( CuPredMode[ chType ][ x0 ][ y0 ] = = MODE_INTER &&
             sps_explicit_mts_inter_enabled_flag ) | |
           ( CuPredMode[ chType ][ x0 ][ y0 ] = = MODE_INTRA &&
             sps_explicit_mts_intra_enabled_flag ) ) )
       mts_idx
   }
  }
 }
}
``` | ae(v)<br><br><br><br><br><br><br><br>ae(v) |

KLT for Secondary Transform

Learning a secondary transform can be simpler than learning a primary transform. This is because the secondary transform is applied to only the low frequency coefficients. That is, it is either applied to the top left 16×16 or top left 48×16 coefficients.

Figure 6:
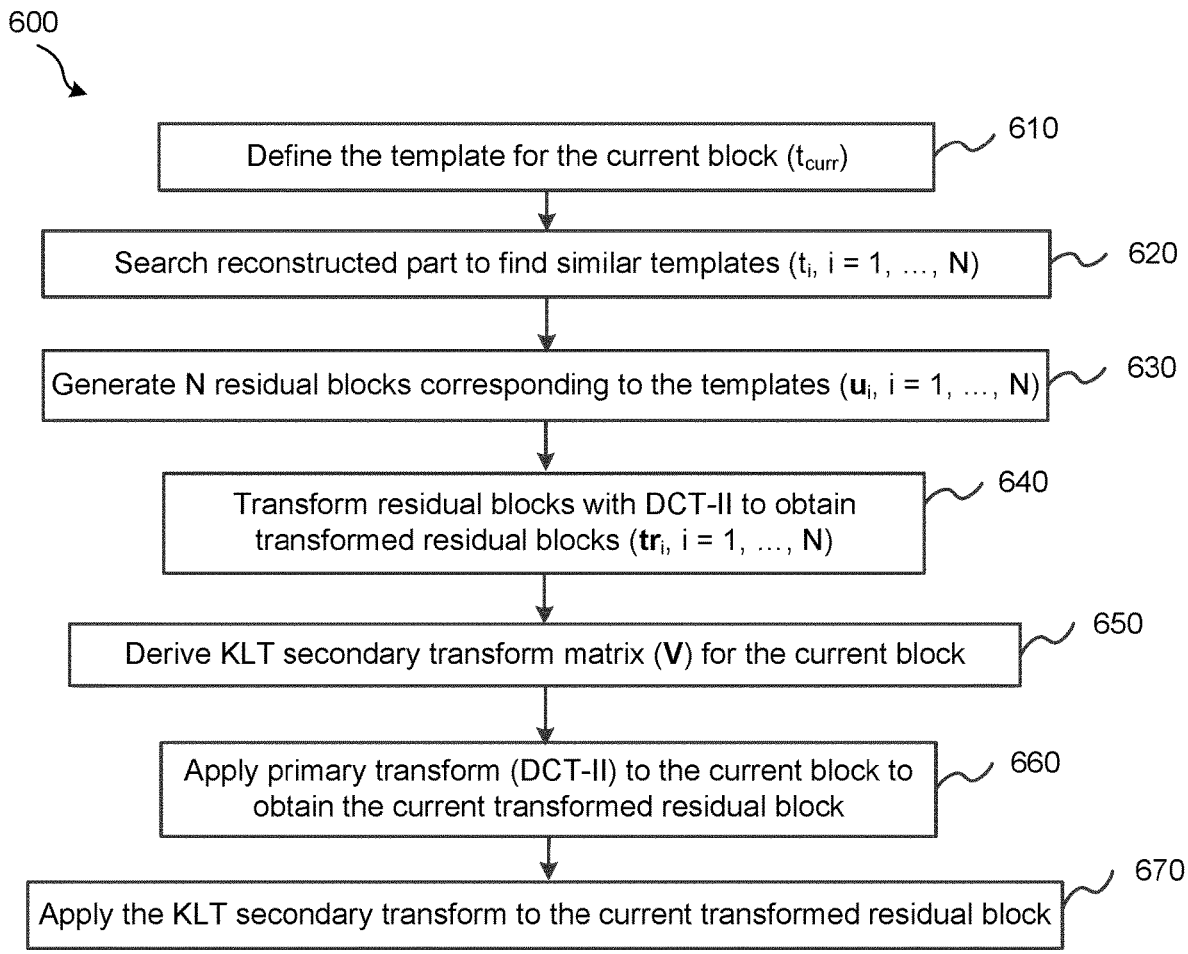
FIG. 6 illustrates a method for deriving a KLT secondary transform matrix, according to an embodiment.

FIG. 6 illustrates a method (600) for deriving a secondary transform, according to an embodiment. In this embodiment, the method for learning a secondary transform follows the same method (500) for primary transform, except that instead of using the residual signal for computing the covariance matrix, the transformed residual with primary transform is used. DCT-II, for example, can be used for primary transform as done in VVC.

For the current block, define (610) the current template as the set of reconstructed pixels of the L-shaped neighbors (up and left) of the current block. Then, the current template is used to search (620) throughout the reconstructed part of the current image to find N similar template. The residual of the target blocks is generated (630) by subtracting from the target blocks (obtained reconstructed images that have similar template) the current prediction block. The residuals of a particular target block are transformed with DCT-II to obtain (640) a transformed residual block (tri) for the particular target block. KLT (V) is derived (650) based on the set of N transformed residual blocks, first by computing the covariance matrix, and then eigenvector of the covariance matrix is used as the transform matrix. KLT can be derived based on all or a subset of the primary transform coefficients. In one example, to be similar to LFNST, we can use the 4×4 top left for small blocks and the three 4×4 top left coefficients for large blocks (LFNST of 46×16). Other methods such as graph based derivation can be used to derive the KLT transform basis.

At step 660, the primary transform (DCT-II) is applied to the current block to obtain the current transformed residual block. At step 670, the KLT secondary transform is applied to the current transformed residual block.

Figure 7:
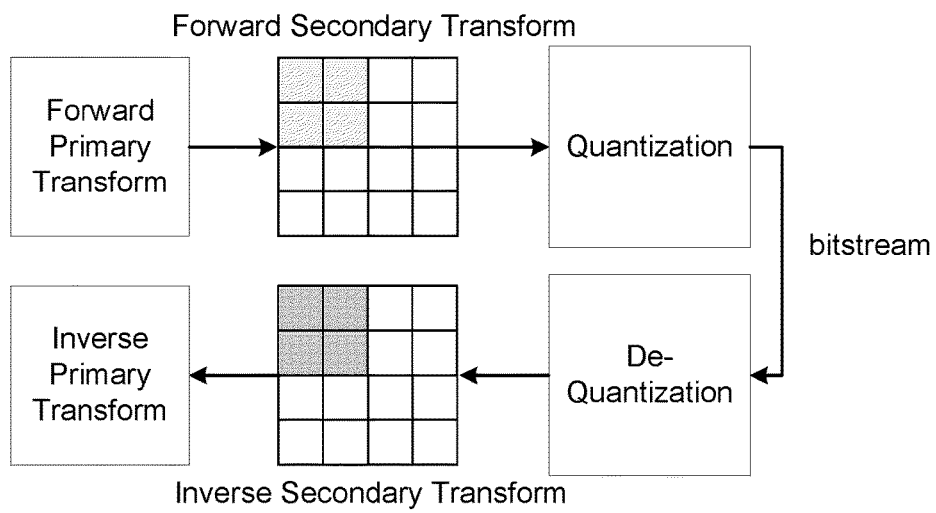
FIG. 7 illustrates the forward secondary transform and inverse secondary transform.

As illustrated in FIG. 7, secondary transform is applied between forward primary transform and quantization (at the encoder side), and between de-quantization and inverse primary transform (at the decoder side). A subset of those coefficients from the primary transform is modified by use of a secondary transform. The KLT secondary transform (V) is applied in the forward secondary transform, and the transpose of the KLT secondary transform, V T, is used in the inverse secondary transform.

Similar to the previous embodiment, LFNST and MTS index shall not be signaled.

KLT for Both Primary and Secondary Transform

Figure 8:
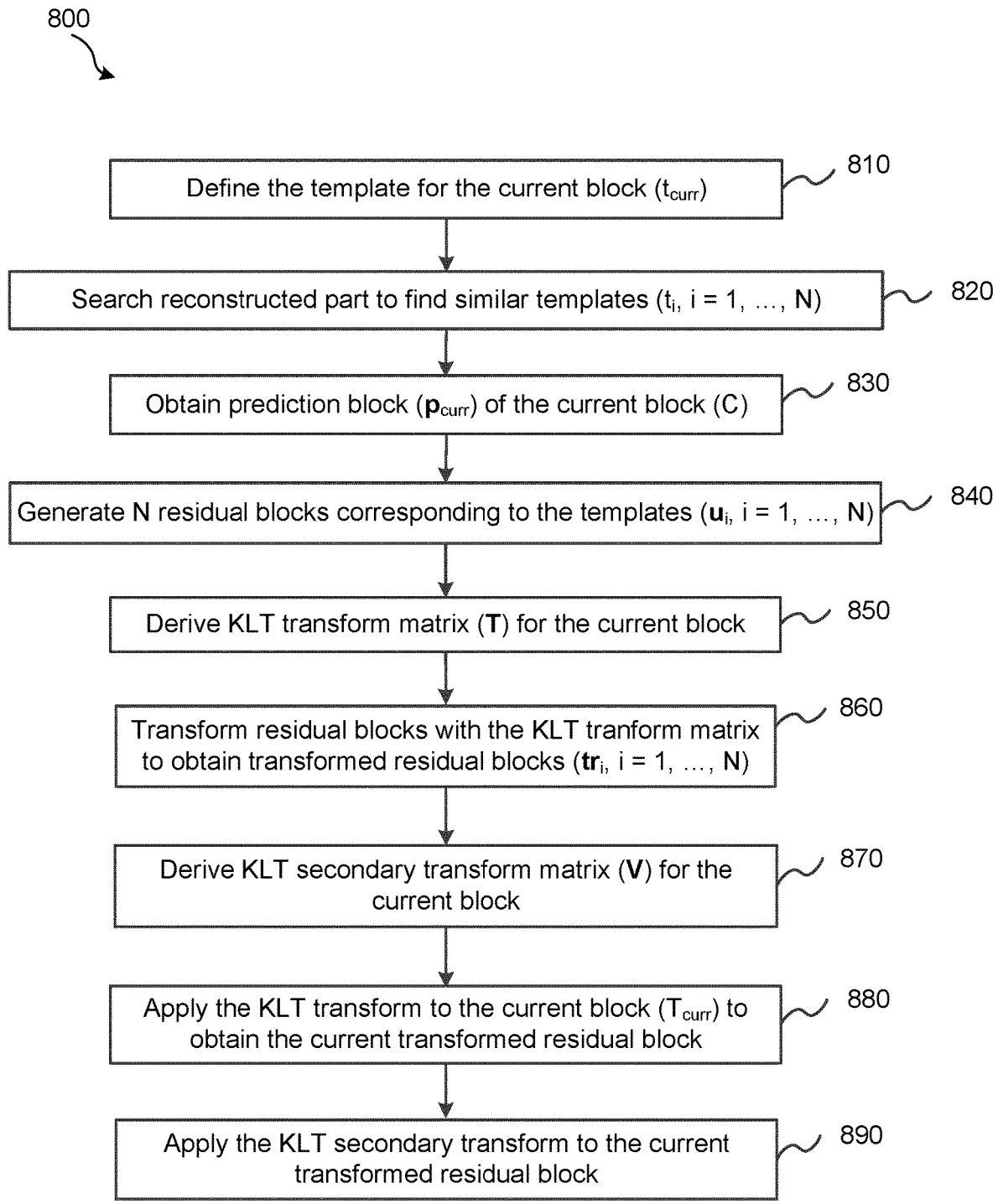
FIG. 8 illustrates a method for deriving a KLT primary transform matrix and a KLT secondary transform matrix at the encoder side, according to an embodiment.

FIG. 8 illustrates a method (800) for deriving KLT for both primary and secondary transform, according to an embodiment. In this embodiment, KLT can be performed for both primary and secondary transform. That is, learning first a primary transform and use it for learning a secondary transform. This is to fully use the picture statistics to achieve the maximum bitrate saving.

Primary transform training is similar to method 500:
For the current block, define (810) the current template as the set of reconstructed pixels of the L-shaped neighbors (up and left) of the current block. The template in general should contain reconstructed samples and be available at the decoder side, and can take another shape other than the L-shape.

Search (820) throughout the reconstructed part of the current image to find N similar templates.

The residual of the target blocks is generated (840) by subtracting from the target blocks (obtained reconstructed images that have similar template) the current prediction block. Note that the prediction block does not necessarily use (830) the template matching prediction mode.

KLT is derived (850) based on the set of N residual blocks, first by computing the covariance matrix between the coefficients on both the horizontal and vertical direction, and then eigenvector of the horizontal and vertical covariance matrix is used as the transform matrix for the horizontal and vertical dimension.

The secondary transform training uses results from primary transform:
The residuals obtained from the target blocks are transformed (860) with two dimensional KLT transform obtained from the primary transform training, to obtain transformed residual blocks.

KLT is derived (870) based on the set of N residual transformed block, first by computing the covariance matrix, and then eigenvector of the covariance matrix is used as the transform matrix, after proper scaling in order to be represented by integer variable within a given bit-depth.

The residuals for the current block are transformed (880) by the KLT primary transform to obtain the current transformed residual block.

The KLT secondary transform is applied (890) to the current transformed residual block. The transform coefficients are then quantized and entropy coded.

Figure 9:
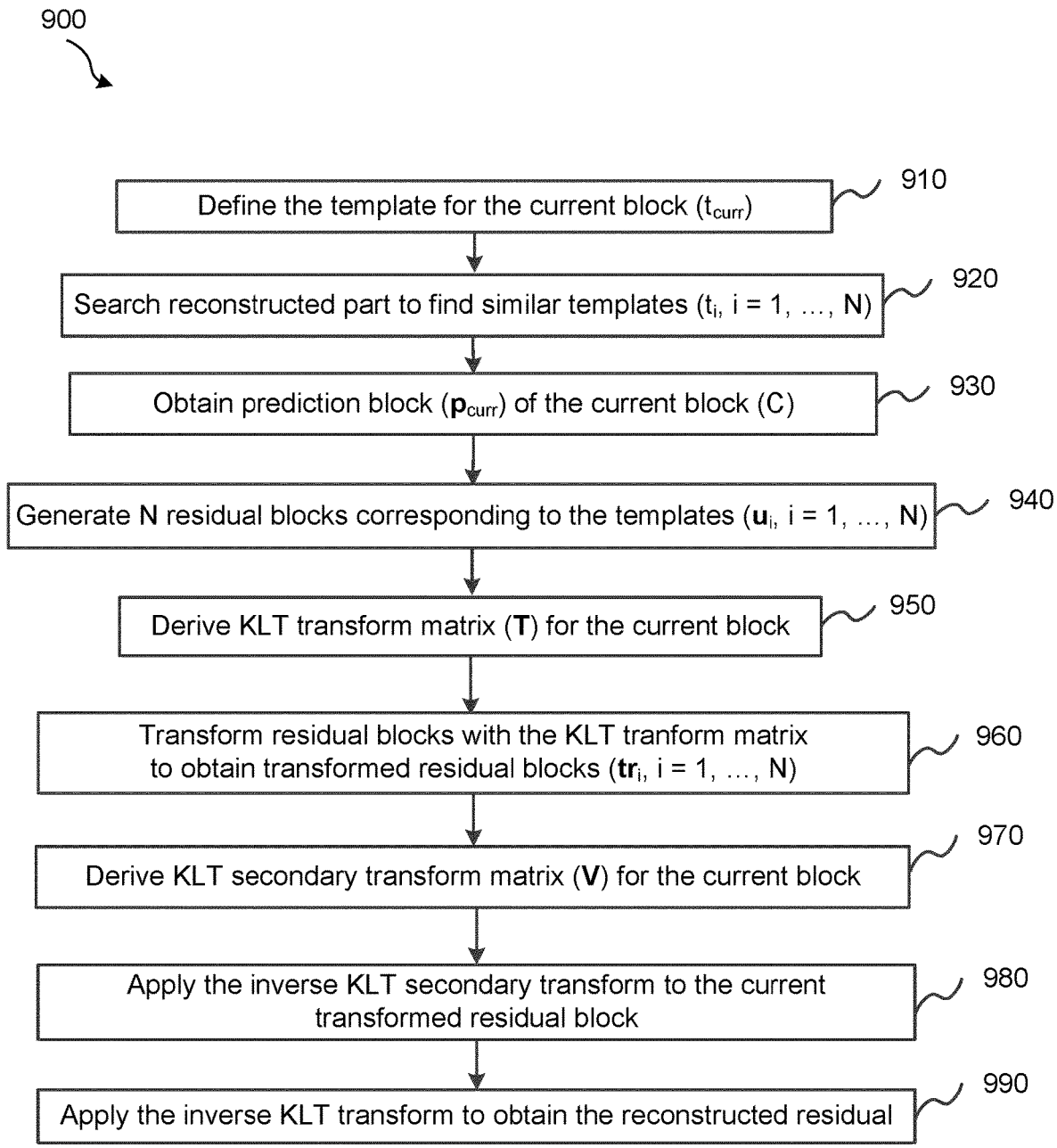
FIG. 9 illustrates a method for deriving a KLT primary transform matrix and a KLT secondary transform matrix at the decoder side, according to an embodiment.

FIG. 9 illustrates a method (900) for deriving KLT for both primary and secondary transform at the decoder, according to an embodiment. Steps 910-970 are the same as steps 810-870 in method 800. After the KLT transform and KLT secondary transform are derived, at step 980, the inverse KLT secondary transform is applied to the current transformed residual block, and at step 990, the inverse KLT transform is applied to the result from step 980 to obtain the reconstructed residual block.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the transform and inverse transform module (225, 240, 350), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video encoding, comprising:
   obtaining a prediction block and a residual block for a current block;
   obtaining a plurality of residual blocks, based on a plurality of respective neighboring blocks and said prediction block for said current block;
   applying a primary transform to said plurality of residual blocks to obtain a plurality of respective transformed residual blocks;
   obtaining a Karhunen Loeve Transform (KLT) transform matrix based on said plurality of transformed residual blocks;
   applying said primary transform to said residual block for said current block, to obtain a current transformed residual block; and
   applying said KLT transform matrix as secondary transform to said current transformed residual block.

2. The method of claim 1, wherein said primary transform is Discrete Cosine Transform type II (DCT-II).

3. The method of claim 1, wherein said primary transform is another KLT transform.

4. The method of claim 1, further comprising:
   encoding a signal indicating that said KLT transform matrix is to be used to transform said residual block for said current block; and
   disabling one or more other transform types for said current block.

5. The method of claim 4, wherein signaling indicating that said KLT transform matrix is to be used is independent from signaling of a prediction type of said current block.

6. An apparatus for video encoding, comprising:
   at least a memory and one or more processors, wherein said one or more processors are configured to:
   obtain a prediction block and a residual block for a current block;
   obtain a plurality of residual blocks, based on a plurality of respective neighboring blocks and said prediction block for said current block;
   apply a primary transform to said plurality of residual blocks to obtain a plurality of respective transformed residual blocks;
   obtain a Karhunen Loeve Transform (KLT) transform matrix based on said plurality of transformed residual blocks;
   apply said primary transform to said residual block for said current block, to obtain a current transformed residual block; and
   apply said KLT transform matrix as secondary transform to said current transformed residual block.

7. The apparatus of claim 6, wherein said primary transform is Discrete Cosine Transform type II (DCT-II).

8. The apparatus of claim 6, wherein said primary transform is another KLT transform.

9. The apparatus of claim 6, wherein said one or more processors are further configured to:
   encode a signal indicating that said KLT transform matrix is to be used to transform said residual block for said current block; and
   disable one or more other transform types for said current block.

10. The apparatus of claim 9, wherein signaling indicating that said KLT transform matrix is to be used is independent from signaling of a prediction type of said current block.

11. A method for video decoding, comprising:
    obtaining a prediction block and transform coefficients for a current block;
    obtaining a plurality of residual blocks, based on a plurality of respective neighboring blocks and said prediction block for said current block;
    applying a primary transform to said plurality of residual blocks to obtain a plurality of respective transformed residual blocks;
    obtaining a Karhunen Loeve Transform (KLT) transform matrix based on said plurality of transformed residual blocks;
    applying said KLT transform matrix as inverse secondary transform to said transform coefficients of said current block to obtain a current inverse secondary transformed block; and
    applying an inverse of said primary transform to said current inverse secondary transformed block to reconstruct a residual block for said current block.

12. The method for claim 11, further comprising:
    decoding a signal indicating that said KLT transform matrix is to be used for inverse transform to reconstruct said residual block for said current block; and
    inferring that one or more other transform types are disabled for said current block.

13. The method of claim 12, wherein said primary transform is Discrete Cosine Transform type II (DCT-II).

14. The method of claim 12, wherein said primary transform is another KLT transform.

15. The method of claim 12, further comprising:
decoding a signal indicating that said KLT transform matrix is to be used to inverse transform to reconstruct said residual block for said current block.

16. An apparatus for video decoding, comprising:
at least a memory and one or more processors, wherein said one or more processors are configured to:
obtain a prediction block and transform coefficients for a current block;
obtain a plurality of residual blocks, based on a plurality of respective neighboring blocks and said prediction block for said current block;
apply a primary transform to said plurality of residual blocks to obtain a plurality of respective transformed residual blocks;
obtain a Karhunen Loeve Transform (KLT) transform matrix based on said plurality of transformed residual blocks;
apply said KLT transform matrix as inverse secondary transform to said transform coefficients of said current block to obtain a current inverse secondary transformed block; and
apply an inverse of said primary transform to said current inverse secondary transformed block to reconstruct a residual block for said current block.

17. The apparatus of claim 16, wherein said one or more processors are configured to:
decode a signal indicating that said KLT transform matrix is to be used for inverse transform to reconstruct said residual block for said current block; and
infer that one or more other transform types are disabled for said current block.

18. The apparatus of claim 16, wherein said primary transform is Discrete Cosine Transform type II (DCT-II).

19. The apparatus of claim 18, wherein said primary transform is another KLT transform.

20. The apparatus of claim 18, wherein said one or more processors are further configured to:
decode a signal indicating that said KLT transform matrix is to be used for inverse transform to reconstruct said residual block for said current block; and
infer that one or more other transform types are disabled for said current block.

* * * * *